United States Patent [19]
Cecchi

[11] 3,813,860
[45] June 4, 1974

[54] MACHINE FOR THE MECHANICAL PICKING OF OLIVES FROM THE TREE

[76] Inventor: Remo Cecchi, 36-W. 40th St., Foggia, 10018

[22] Filed: Nov. 3, 1972

[21] Appl. No.: 303,559

[30] Foreign Application Priority Data
Nov. 10, 1971 Italy .................................. 11804/71

[52] U.S. Cl. ............................................. 56/328 R
[51] Int. Cl. ........................................... A01g 19/08
[58] Field of Search ........................... 56/328 R, 330

[56] References Cited
UNITED STATES PATENTS
3,210,921 10/1965 Middlesworth ................... 56/328 R
3,601,962 8/1971 Townsend ......................... 56/328 R Primary Examiner—Antonio F. Guida
Assistant Examiner—J. N. Eskovitz
Attorney, Agent, or Firm—Allison C. Collard

[57] ABSTRACT

All the olives are picked from the tree, irrespective of their ripeness, by means of a machine capable of exerting an adjustable force without damaging the leaves and the branches. This machine comprises a plurality of extended teeth, mounted parallel one another on a common support and each adapted to follow a curved path of which the tooth is the generating line. In the illustrated embodiment the teeth are crank-shaped and are driven through their end which is offset with respect to their elongated portion. There are preferably provided devices for preventing the jam of all the teeth and, alternately with, and parallel to the movable teeth, a plurality of stationary teeth.

2 Claims, 2 Drawing Figures

PATENTED JUN 4 1974　　3,813,860

MACHINE FOR THE MECHANICAL PICKING OF OLIVES FROM THE TREE

BACKGROUND OF THE INVENTION

The present invention relates to a machine for the mechanical picking of olives from the tree.

It is known that so far numerous types of machines have been used for mechanically picking or gathering olives.

All these machines may be substantially classified, as to their operation, in machines which cause the fall of the olives from a tree by means of vibrators, combs, air jets, etc.

It is further known that the olives ripen during a rather long time period, of about four months, whereby on the same olive-tree, throughout all this time there are ripe olives which sooner or later will fall from the tree, and still unripe olives.

Therefore the machines for mechanically gathering olives did not give so far the wished results, since they were not able to pick all the olives of a tree. In fact the machines presently known exert an inadequate force to pluck the green olives, which give the most valuable harvest.

SUMMARY OF THE INVENTION

It is an object of the present invention to provide a machine for mechanically picking olives which does not show the above-mentioned drawbacks and can pluck all the olives on each branch of any olive-tree on which such a machine is made to operate, irrespective of the ripeness degree of the fruits.

It is another object of the invention to provide a machine for mechanically picking olives, adapted to achieve the harvesting operation of the olive-tree branches with an adjustable force, so that all the olives of each tree, either completely unripe or already mature, are plucked in only one gathering operation without causing the leaves to fall and the tree branches to be damaged.

The picking machine according to this invention comprises a plurality of beater means formed by extended teeth, substantially parallel one another, each of which is mounted on a support, common to all the teeth, through an end portion operated by a motor means which is adapted to move said teeth in a rotary motion along a path of which the tooth is substantially the generating line, means being provided for synchronizing said teeth during their movement.

BRIEF DESCRIPTION OF THE DRAWINGS

Further objects, features and advantages of the machine according to the present invention will be fully understood from the following detailed specification illustrating by way of non-limiting example an embodiment of this machine with reference to the accompanying drawing in which.

DETAILED DESCRIPTION OF THE PREFERRED EMBODIMENT

Figure 1:
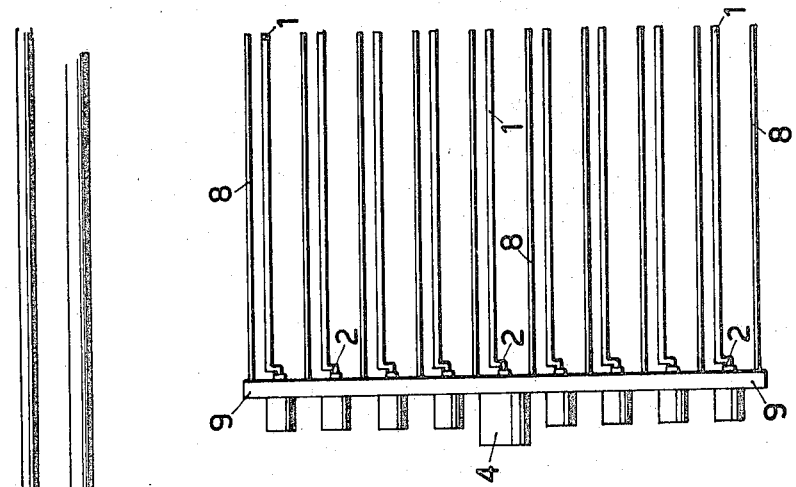
FIG. 1 shows a diagrammatic overall view of one embodiment of the machine of the invention.

With reference to the drawing, the machine according to the present invention comprises a number of extended teeth 1, which are the beater means capable of carrying out the gathering operation. Each tooth 1, made of steel or any other suitable material of adequate strength, is formed with a crank 2 whereby the extended portion of the tooth is offset and parallel in respect of the rotation axis which is in coincidence with the end 3, opposite to the free end of the tooth.

All the teeth, parallel one another, are mounted at said end 3 on a common support. The end 3 is connected, through driving means, with a main motor 4, hydraulically, pneumatically or electrically operated or by another source of energy. In operation the extended portion of each tooth 1 will run along a circular path the radius of which is the length of the crank 2. However in general tooth 1 will move along whichever path, e.g. of elliptical shape, defining surfaces of which the tooth is the ideal generating line. This can be achieved for example by the resultant movement of two translation motions of the end 3, by means of cams, etc.

Figure 2:
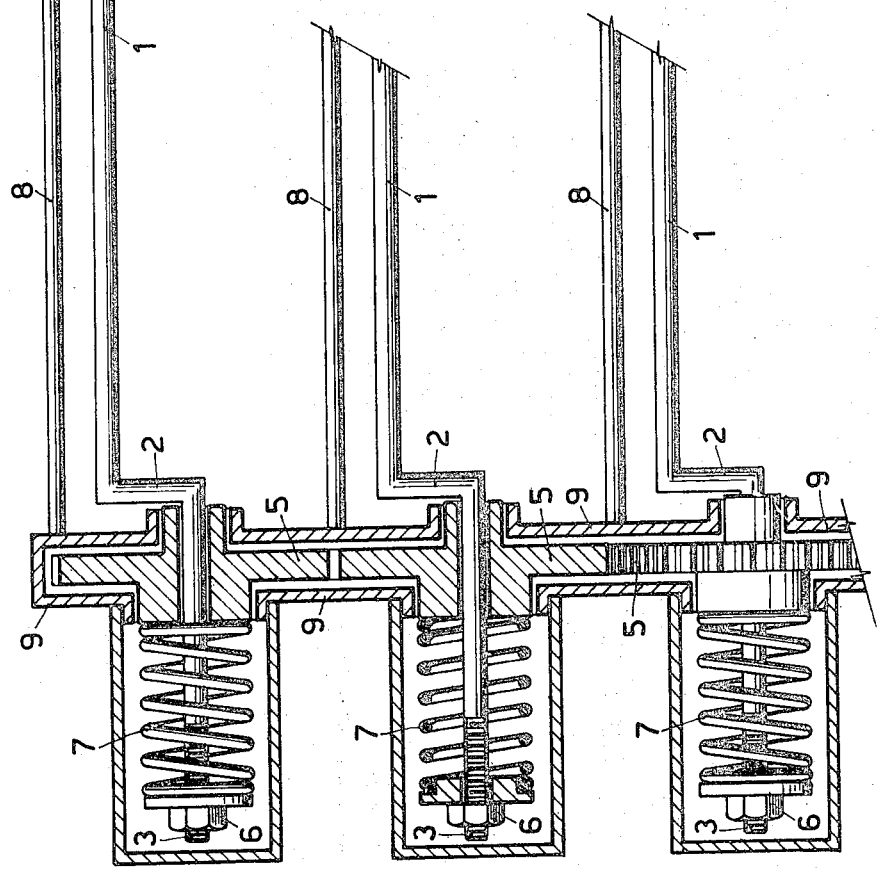
FIG. 2 shows a partial, cross-sectional view of the machine of FIG. 1, taken along a plane containing a row of teeth.

Irrespective of the way by which the movement of the teeth is obtained, all the teeth 1 are preferably mutually synchronized, such as by means of the gears 5 of FIG. 2, or also any other known driving means. It is to be understood that the directions of movement of the teeth may be the same or opposite one another as wished.

With further reference to FIG. 2, the teeth 2 are preferably connected in a non rigid manner with the driving and synchronizing means 5, housed in a gear-box 9 which is also the above-mentioned common support of the entire plurality of teeth. According to the illustrated embodiment, the teeth are provided, at their ends 3, with a clutch means embodied in the drawing by a spring 7, which is caused to be compressed between each gear 5 and an associate nut 6, screwed on the end 3 of each tooth 1. Thus each gear 5 drives the end 3 of a tooth 1 through such clutch means, not being integral with the tooth on which the gear is mounted. The function of said clutch means is that of preventing all the teeth from stopping when one or more of them should jam for any reason. With this arrangement the teeth which are still free to move will continue their rotation being driven by the gears 5 slipping on the end 3 of the jammed tooth or teeth.

In the illustrated embodiment there are also provided stationary teeth 8, fixed on the gear-box 9 and parallel to the teeth 1, having the function of withstanding and sustaining the flexible olive-bearing branches on which the action of the rotating teeth 1 is exerted. These stationary teeth 8 may however be unnecessary, if they are not required by the ripeness degree of the olives, type of the trees or cultivation and method of pruning employed in the olive-yard in which the mechanical picking is to be effected.

In order to pick the olives by means of the machine of this invention the teeth 1 are inserted among the olive-branches charged with fruits. Such teeth, by rotating as previously stated so as to be always in parallelism with their length, effect a complete picking operation on the olive-branches, causing the olives to fall. The olives will be then gathered by means of known methods. The force exerted during the picking action depends on the tip speed value of the teeth 1 and therefore, in the above-described embodiment, it is a function of the angular speed and the length of crank 2. This force can thus be controlled in each case according to the ripeness degree of olives, by acting on the speed of the motor 4 if this is of the variable speed-type or on the length of crank 2, if the latter has an adjustable length.

It is to be appreciated that the olive-picking machine of the present invention is easy to handle, of light weight and little encumbering, so that it can be operated even by hand and brought in contact with the olive-branches, such as by means of simple extension rods or poles. It can also be applied onto a crane, e.g., of the hydraulic type, carried by a tractor, so that the gathering operation is completely mechanized.

Further additions and/or modifications to the above described and illustrated embodiment of the machine according to the invention can be effected by those skilled in the art without exceeding the scope thereof, ad defined by the appended claims.

It is further to be understood that such a machine, possibly modified in a proper manner, can be used for gathering not only olives but also other fruits, such as hazel-nuts.

What I claim is:

1. A machine for the mechanical picking of olives and the like comprising:

a gear box having a plurality of synchronized gears coupled to each other in spaced-apart relationship;

a plurality of longitudinal beater rods each pivotably disposed in said gear box and through the axis of each gear, said rod including an integrally formed crank arm offset from the axis of its associated gear;

clutch means frictionally retaining each of said beater rods to each of said gears;

motor means coupled to said synchronized gears for rotating each of said beater rods through a prescribed circular path defined by the offset crank arm; and a plurality of stationary rods secured to said gear box and each adjacent to the circular path defined by the rotation of each beater rod, and substantially parallel to each beater rod.

2. The machine as recited in claim 1 wherein said clutch means comprises a plurality of compression springs each of which is compressively coupled between one end of each of said beater rods and each of said gears.

* * * * *